United States Patent
Li et al.

(10) Patent No.: US 10,193,991 B2
(45) Date of Patent: Jan. 29, 2019

(54) METHODS AND APPARATUSES FOR PROVIDING INFORMATION OF VIDEO CAPTURE DEVICE

(71) Applicant: Xiaomi Inc., Beijing (CN)

(72) Inventors: Feiyun Li, Beijing (CN); Changbing Chen, Beijing (CN); Enxing Hou, Beijing (CN)

(73) Assignee: Xiaomi Inc., Beijing (CN)

( * ) Notice: Subject to any disclaimer, the term of this patent is extended or adjusted under 35 U.S.C. 154(b) by 236 days.

(21) Appl. No.: 15/202,018

(22) Filed: Jul. 5, 2016

(65) Prior Publication Data
US 2017/0013074 A1    Jan. 12, 2017

(30) Foreign Application Priority Data

Jul. 7, 2015    (CN) .......................... 2015 1 0395465

(51) Int. Cl.
*H04L 12/18*    (2006.01)
*H04L 29/08*    (2006.01)
(Continued)

(52) U.S. Cl.
CPC .......... *H04L 67/24* (2013.01); *H04L 12/1813* (2013.01); *H04L 12/1822* (2013.01);
(Continued)

(58) Field of Classification Search
CPC .......... H04L 67/24; H04L 12/18; H04L 43/04
(Continued)

(56) References Cited

U.S. PATENT DOCUMENTS

| 6,088,737 A * | 7/2000 | Yano ....................... G06F 9/505 709/224 |
| 6,741,276 B1 | 5/2004 | Yonezawa et al. |

(Continued)

FOREIGN PATENT DOCUMENTS

| CN | 1941953 A | 4/2007 |
| CN | 101159970 A | 4/2008 |

(Continued)

OTHER PUBLICATIONS

International Search Report issued in International Patent Application No. PCT/CN2015/090363, mailed from the State Intellectual Property Office of China dated Apr. 12, 2016.

(Continued)

*Primary Examiner* — Glenford J Madamba
(74) *Attorney, Agent, or Firm* — Finnegan, Henderson, Farabow, Garrett & Dunner LLP

(57) ABSTRACT

Disclosed includes a method for providing an operation status of a video capture device over a network is provided. The method is performed by the video capture device and comprises: receiving a communication request from a terminal; determining, based on the communication request, one or more terminals connected with the video capture device; and transmitting status information of the video capture device to the network, the status information including information of the one or more terminals connected with the video capture device. Since the video capture device can transmit status information including information of one or more terminals to the network, after determining the one or more terminals are connected with the video capture device, information about which terminals are connected with the video capture device can become known to other devices connected with the network. As a result, the operation of the video capture device becomes more secure.

11 Claims, 15 Drawing Sheets

(51) Int. Cl.
*H04L 12/26* (2006.01)
*H04N 7/14* (2006.01)

(52) U.S. Cl.
CPC .......... *H04L 43/04* (2013.01); *H04L 43/0817* (2013.01); *H04L 43/10* (2013.01); *H04L 43/16* (2013.01); *H04N 7/147* (2013.01)

(58) Field of Classification Search
USPC ........................................................ 709/224
See application file for complete search history.

(56) References Cited

U.S. PATENT DOCUMENTS

| | | | |
|---|---|---|---|
| 8,203,592 | B2 | 6/2012 | Nelson et al. |
| 9,813,448 | B2* | 11/2017 | Matityahu ............... H04L 63/20 |
| 2004/0028391 | A1 | 2/2004 | Black et al. |
| 2004/0250137 | A1 | 12/2004 | Takahashi |
| 2009/0110368 | A1 | 4/2009 | Nelson et al. |
| 2013/0318250 | A1 | 11/2013 | Seo |
| 2014/0114664 | A1 | 4/2014 | Khan et al. |
| 2014/0226030 | A1 | 8/2014 | Aizawa |
| 2015/0042750 | A1 | 2/2015 | Vivekanandan et al. |
| 2015/0062344 | A1* | 3/2015 | Sano ...................... G11B 27/11 348/159 |

FOREIGN PATENT DOCUMENTS

| | | |
|---|---|---|
| CN | 101282450 A | 10/2008 |
| CN | 101848374 A | 9/2010 |
| CN | 102355632 A | 2/2012 |
| CN | 103533028 A | 1/2014 |
| JP | 04-294662 A | 10/1992 |
| JP | 2002-525750 A | 8/2002 |
| JP | 2003-46968 A | 2/2003 |
| JP | 2004-328082 A | 11/2004 |
| JP | 2005117621 A | 4/2005 |
| JP | 2005136550 A | 5/2005 |
| JP | 2005-333446 A | 12/2005 |
| JP | 2006-174414 A | 6/2006 |
| JP | 2006186821 A | 7/2006 |
| JP | 2008-288892 A | 11/2008 |
| JP | 2009-111991 A | 5/2009 |
| JP | 2009134389 A | 6/2009 |
| JP | 2010-186459 A | 8/2010 |
| JP | 2013-138279 A | 7/2013 |
| KR | 10-2013-0003886 A | 1/2013 |
| KR | 10-2013-0139431 A | 12/2013 |
| RU | 2551128 C1 | 5/2015 |
| WO | WO 2012/174845 A1 | 12/2012 |
| WO | WO 2013/061389 A1 | 5/2013 |
| WO | WO 2015/073519 A1 | 5/2015 |

OTHER PUBLICATIONS

Russian Office Action issued in Russian Patent Application No. 2016115696/07(024685), dated Jan. 9, 2017.
Ken et al., "How to Make a Secure Web Application," Software Design, dated Nov. 18, 2011.
Hiroshi Tokumaru, "Detailed Description of Various Setting Methods and Actual Operation Method VPS Server Challenge," Developing Secure Web Applications, dated Jun. 14, 2012.

* cited by examiner

METHODS AND APPARATUSES FOR PROVIDING INFORMATION OF VIDEO CAPTURE DEVICE

CROSS-REFERENCE TO RELATED APPLICATIONS

This application is based on and claims priority to Chinese Patent Application No. 201510395465.6, filed on Jul. 7, 2015, the entire contents of which are incorporated herein by reference.

TECHNICAL FIELD

The present disclosure generally relates to technical field of communications, and more particularly, to methods and apparatuses for providing an operation status of a video capture device over a network.

BACKGROUND

Cameras are widely used in various applications, such as video conference, distance education, telemedicine, etc. The cameras can be used for capturing video data, which can then be transmitted over a network to a display device for display, to improve user experiences for these applications. Moreover, cameras are also used to transmit real-time videos of a location to provide real-time monitoring, to improve security.

SUMMARY

The embodiments of the present disclosure provide a method for providing an operation status of a video capture device over a network, and an apparatus thereof.

On one hand, a method for providing an operation status of a video capture device over a network is provided. The method is performed by the video capture device and comprises:

receiving a communication request from a terminal;

determining, based on the communication request, one or more terminals connected with the video capture device; and transmitting status information of the video capture device to the network, the status information including information of the one or more terminals connected with the video capture device.

On the other hand, another method for providing an operation status of a video capture device over a network is provided. The method is performed by a system communicatively coupled with the video capture device over the network, and comprises:

receiving, from the video capture device, status information including information of one or more terminals connected with the video capture device; and transmitting the status information to a predetermined terminal, wherein the predetermined terminal is a terminal associated with the video capture device.

Further, an apparatus for providing an operation status of a video capture device over a network is provided. The apparatus comprises a processor, a memory for storing instructions executable by the processor, wherein the processor is configured to:

receive a communication request from a terminal;

determine, based on the communication request, one or more terminals connected with the video capture device; and transmit status information of the video capture device to the network, the status information including information of the one or more terminals connected with the video capture device.

Moreover, an apparatus for providing an operation status of a video capture device over a network is provided. The apparatus comprises a processor, and a memory for storing instructions executable by the processor, wherein the processor is configured to:

receive, from the video capture device, status information including information of one or more terminals connected with the video capture device; and transmit the status information to a predetermined terminal, wherein the predetermined terminal is a terminal associated with the video capture device.

With embodiments of the present disclosure, after determining one or more terminals that are connected with a video capture device, the video capture device can transmit status information including information of the one or more terminals to the network. Information about which terminals are connected with the video capture device (and have access to the video data captured by the video capture device) can become known to other devices connected with the network. As a result, the operation of the video capture device can become more secure.

It will be appreciated that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Embodiments of the present disclosure provide a method 100 for providing an operation status of a video capture device over a network. Method 100 can be performed by a video capture device (e.g., a camera) that is communicatively coupled with a system (e.g., a server, a terminal, etc.) via a network. The video capture device may be a camera connected with Internet, which can be used for real-time communication or real-time monitor. When being used for real-time communication. The video capture device may also be an external camera or a build-in camera of a terminal.

Figure 1:
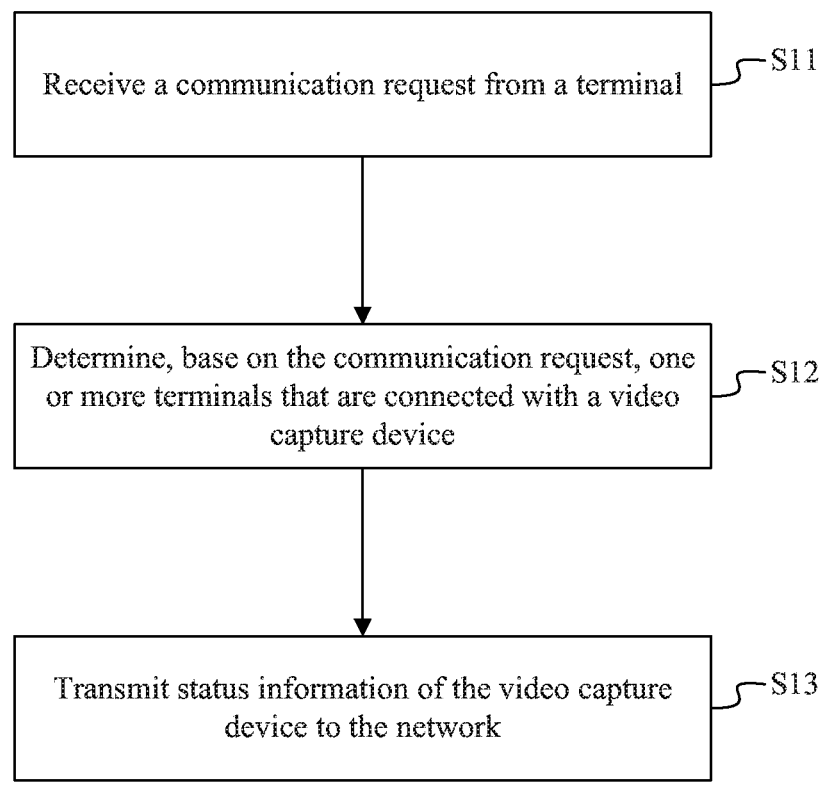
FIG. 1 is a flow chart illustrating a method for providing an operation status of a video capture device over a network, according to an exemplary embodiment.

FIG. 1 is a flow chart illustrating method 100 for providing an operation status of a video capture device over a network, according to an exemplary embodiment. Referring to FIG. 1, method 100 may include the following steps S11-S13:

In step S11, the video capture device may receive a communication request from a terminal.

In step S12, the video capture device may determine, based on the communication request, one or more terminals that are connected with the video capture device.

In step S13, the video capture device may transmit its status information to the network, the status information including information of the one or more terminals connected with the video capture device.

As an illustrative example, a camera connected with the Internet may receive a communication request from a terminal. The camera may determine, based on the communication request, one or more terminals connected with the camera, and may transmit information of the one or more terminals to the network. Herein, the communication request may be configured to cause the camera to transmit video data to a terminal.

With embodiments of the present disclosure, after determining one or more terminals that are connected with a video capture device, the video capture device can transmit status information including information of the one or more terminals to the network. Information about which terminals are connected with the video capture device (and have access to the video data captured by the video capture device) can become known to other devices connected with the network. As a result, the operation of the video capture device can become more secure.

Figure 2:
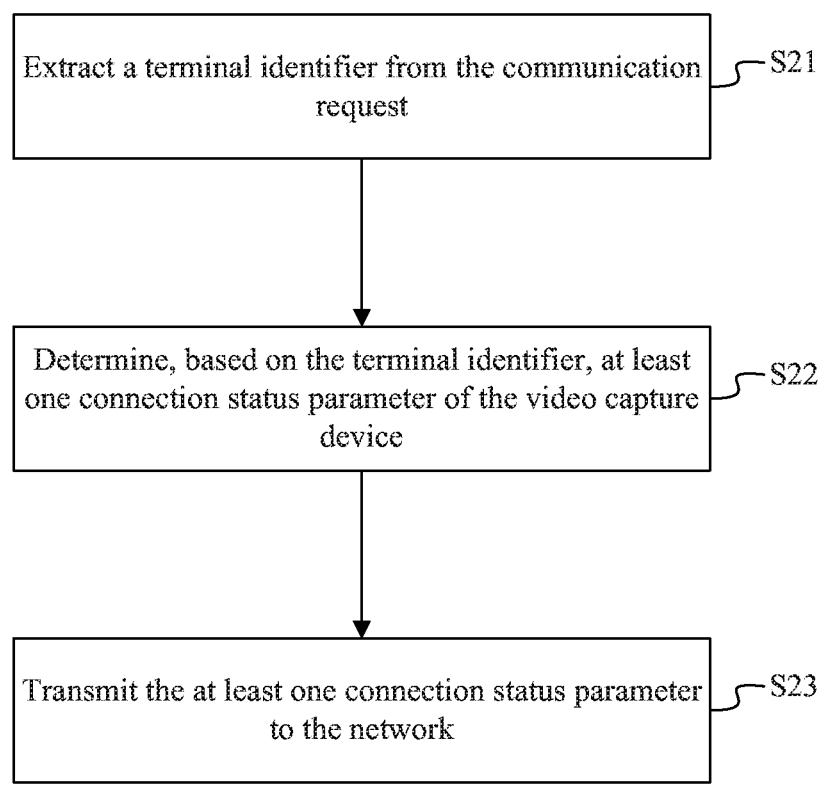
FIG. 2 is a flow chart illustrating a method for providing an operation status of a video capture device over a network, according to an exemplary embodiment.

FIG. 2 is a flow chart illustrating a method 200 for providing an operation status of a video capture device over a network, according to an exemplary embodiment. For example, method 200 may include sub-steps of step S12 of FIG. 1. As shown in FIG. 2, method 200 may include the following steps S21-S23:

In step S21, the video capture device extracts a terminal identifier from the communication request.

In step S22, the video capture device determines, based on the terminal identifier, at least one connection status parameter of the video capture device. The connection status parameter indicates an operation status of the video capture device, and may include at least one of: a first value representing a number of terminals currently connected with the video capture device, and a second value representing a number of terminals connected with the video capture device during a preset time interval.

In step S23, the video capture device transmits the at least one connection status parameter to the network.

As an illustrative example, a communication request transmitted by a terminal may include a terminal identifier of that terminal. After receiving the communication request, the camera may extract the terminal identifier from the communication request, and determine at least one connection status parameter of the camera based on the terminal identifier. The connection status parameter may include one of: a first value representing a number of terminals currently connected with the camera, and a second value representing a number of terminals connected with the camera during a preset time interval.

With embodiments of the present disclosure, a number of terminals connected with the video capture device can be identified based on the terminal identifier. By monitoring a number of terminals that have access to the video capture device, the likelihood of unauthorized access of the video capture device can be minimized. As a result, the operation of the video capture device can become more secure.

In some embodiments, the information of terminals connected with the video capture device, included in the status information as described in step S13 of FIG. 1, may include at least one of: terminal identifiers of the terminals connected with the video capture device, and the connection status parameter of the video capture device.

With embodiments of the present disclosure, by providing different types of information of terminals connected with the video capture device, the system can provide a greater variety of information of these terminals. As a result, the operation of the video capture device can become more secure.

In some embodiments, the transmission of status information of the video capture device to the network, in step S13 of FIG. 1, may occur at a preset time, or may occur when the video capture device determines that the at least one connection status parameter exceeds a preset threshold.

As an illustrative example, the video capture device may transmit its status information to the network at a preset time, or if the video capture device determines that a number of terminals connected with it, as reflected by the at least one connection status parameters, exceeds a preset threshold.

With embodiments of the present disclosure, the video capture device can transmit status information of the video capture device in different manners. Therefore, a greater variety of modes of transmission of the status information can be provided, and the operation of the video capture device can become more secure.

Figure 3:
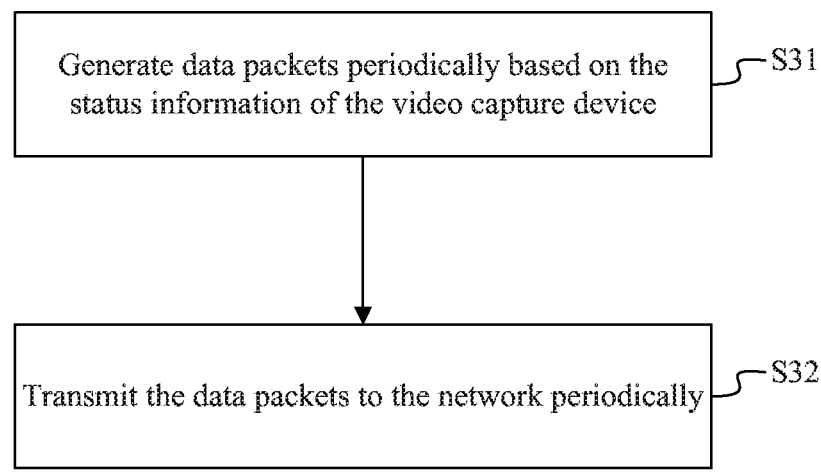
FIG. 3 is a flow chart illustrating a method for providing an operation status of a video capture device over a network, according to an exemplary embodiment.

FIG. 3 is a flow chart illustrating a method 300 for providing an operation status of a video capture device over a network, according to an exemplary embodiment. For example, method 300 may include sub-steps of step S13 of FIG. 1. As shown in FIG. 3, method 300 may include the following steps S31-S32:

In step S31, the video capture device generates data packets, such as heartbeat packets, based on the status information of the video capture device. The data packets can be generated periodically between a certain time interval.

In step S32, the video capture device transmits the data packets to the network periodically, for transmitting the status information of the video capture device to the network.

With embodiments of the present disclosure, the network may receive status information of the video capture device periodically. As a result, the connectivity between the network and the video capture device can be verified and maintained.

Figure 4:
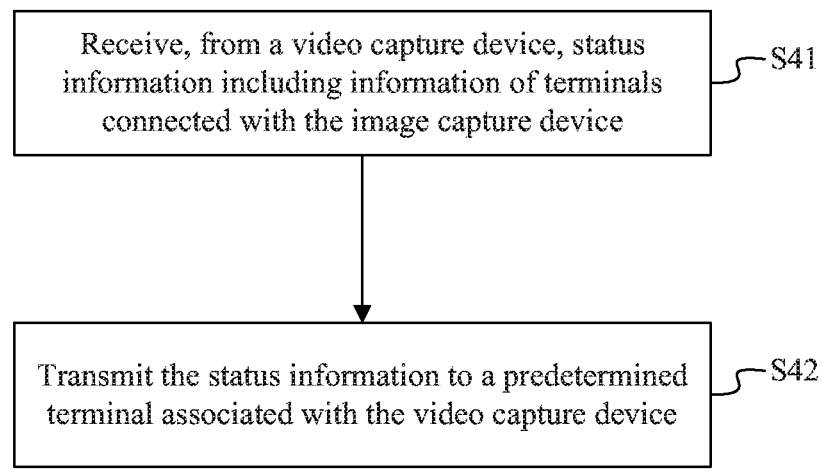
FIG. 4 is a flow chart illustrating a method for providing an operation status of a video capture device over a network, according to an exemplary embodiment.

FIG. 4 is a flow chart illustrating a method 400 for providing an operation status of a video capture device over a network, according to an exemplary embodiment. Method 400 can be performed by a system (e.g., a server, a router, etc.) that is communicatively coupled with a video capture device via a network. Referring to FIG. 4, method 400 may include the following steps S41-S42.

In step S41, the system receives, from the video capture device, status information including information of terminals connected with the video capture device.

In step S42, the system transmits the status information to a predetermined terminal, wherein the predetermined terminal is a terminal that is associated with the video capture device.

With embodiments of the present disclosure, a predetermined terminal associated with the video capture device can be enabled to acquire the status information of the video capture device.

Figure 5:
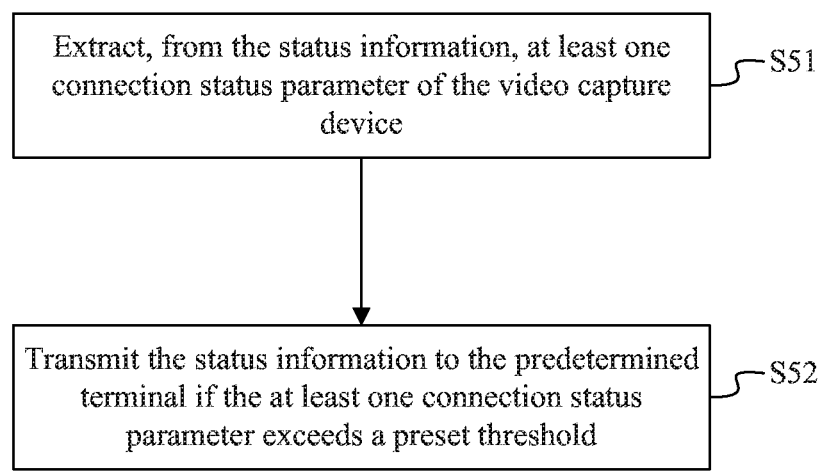
FIG. 5 is a flow chart illustrating a method for providing an operation status of a video capture device over a network, according to an exemplary embodiment.

FIG. 5 is a flow chart illustrating a method 500 for providing an operation status of a video capture device over a network, according to an exemplary embodiment. Method 500 may include sub-steps of S42 of FIG. 4. As shown in FIG. 5, method 500 may include the following steps S51-S52:

In step S51, the system extracts at least one connection status parameter of the video capture device from the status information.

In step S52, the system determines whether that the at least one connection status parameter exceeds a preset threshold; if the system determines that the at least one connection status parameter exceeds the preset threshold, the system may transmit the status information to the predetermined terminal.

As an illustrative example, the system may be a smart router configured to receive status information from a camera, and extract at least one connection status parameter of the camera from the status information. If the smart router determines that the at least one connection status parameter exceeds a preset threshold, the smart router may transmit the status information to a terminal associated with the camera.

The connection status parameter may include a value that represents a number of terminals connected with the camera. Moreover, the terminal associated with the camera may be a terminal authorized to access the status information of the camera.

With embodiments of the present disclosure, the system may allow the predetermined terminal to acquire the status information, if the system determines that the connection status parameter of the video capture device exceeds the preset threshold.

Figure 6:
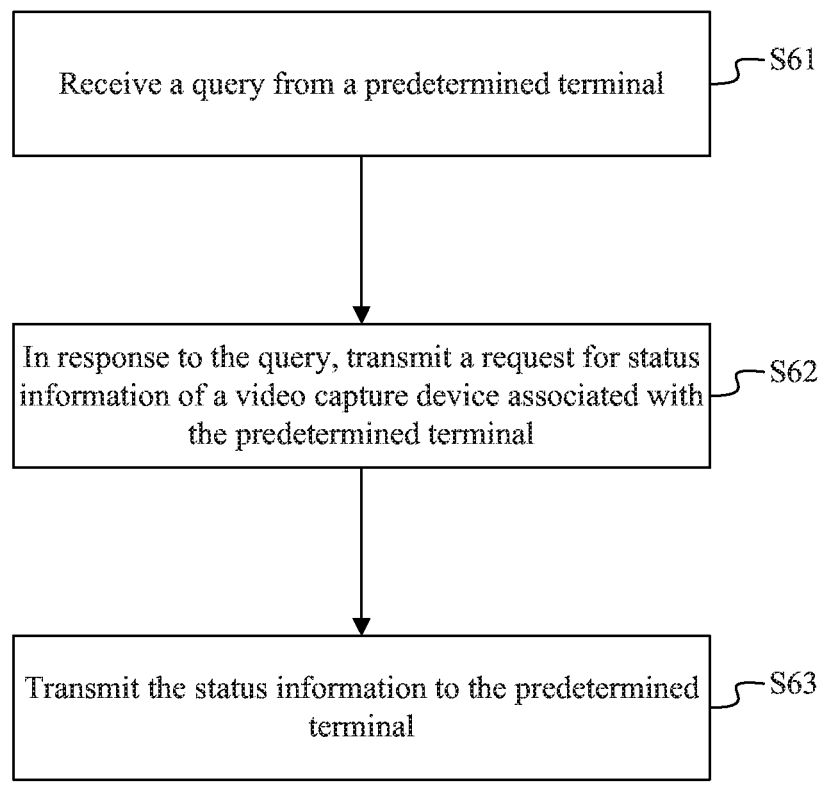
FIG. 6 is a flow chart illustrating a method for providing an operation status of a video capture device over a network, according to an exemplary embodiment.

FIG. 6 is a flow chart illustrating a method 600 for providing an operation status of a video capture device over a network, according to an exemplary embodiment. For example, method 600 can include sub-steps of S42 of FIG. 4. As shown in FIG. 6, method 600 may include the following steps S61-S63.

In step S61, the system may receive a query from the predetermined terminal.

In step S62, in response to the query, the system may acquire status information of a video capture device associated with the predetermined terminal.

In step S63, the system may transmit the status information to the predetermined terminal.

Using the illustrative example above, the smart router may receive, from a terminal, a query for status information of a camera associated with the terminal. In response to the query, the smart router may acquire the status information of the camera, and transmit the status information back to the terminal.

With embodiments of the present disclosure, a predetermined terminal may transmit a query to a system for status information of the video capture device associated with the predetermined terminal. The system may acquire the status information after receiving the query, and provide the status information to the predetermined terminal, which enables the predetermined terminal to acquire status information of the associated video capture device.

In some embodiments, the status information may be transmitted to the predetermined terminal at preset times (e.g., periodically between one time interval, or between different time intervals). With such an arrangement, the system can proactively push the status information to the predetermined terminal, so that the predetermined terminal can possess the most up-to-date status information.

Figure 7:
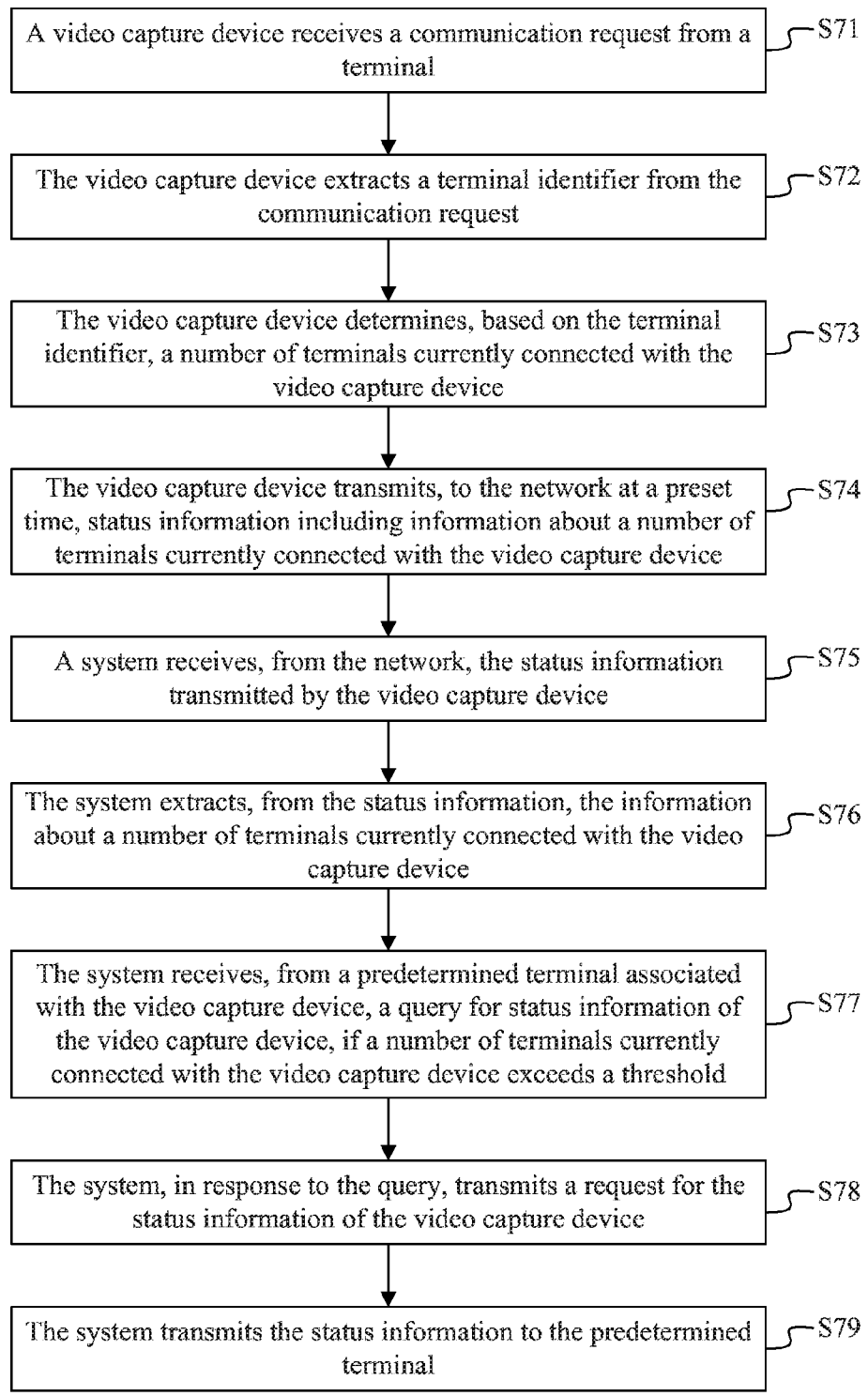
FIG. 7 is a flow chart illustrating a method for providing an operation status of a video capture device over a network, according to an exemplary embodiment.

FIG. 7 is a flow chart illustrating a method 700 for providing an operation status of a video capture device over a network, according to an exemplary embodiment. Method 700 can be performed by a system (e.g., a server, a router, etc.) and a video capture device coupled via a network. Referring to FIG. 7, method 700 may include the following steps S71-S79:

In step S71, the video capture device receives a communication request sent from a terminal over the network.

In step S72, the video capture device extracts a terminal identifier from the communication request.

In step S73, the video capture device determines, based on the terminal identifier, a number of terminals currently connected with the video capture device.

In step S74, the video capture device transmits status information to the network at a preset time, the status information including information about a number of terminals currently connected with the video capture device determined in step S73.

In step S75, the system receives, from the network, the status information transmitted by the video capture device.

In step S76, the system extracts, from the status information, the information about a number of terminals currently connected with the video capture device.

In step S77, the system receives, from a predetermined terminal associated with the video capture device, a query for status information of the video capture device, when a number of terminals currently connected with the video capture device exceeds a preset threshold.

In step S78, the system, in response to the query, acquires the status information of the video capture device.

In step S79, the system transmits the status information to the predetermined terminal.

In some embodiments, the status information in step S74 may also include information of terminals connected with the video capture device. The information of terminals connected with the video capture device may include at least one of: terminal identifiers of the terminals connected with the video capture device, and at least one connection status parameter of the video capture device.

In some embodiments, the at least one connection status parameter may include at least one of: a first value representing the number of terminals currently connected with the video capture device, and a second value representing a number of terminals connected with the video capture device during a preset time interval. In that case, the video capture device may, in step S73, determine a number of terminals connected with the video capture device during the preset time interval, according to the terminal identifier received in the communication request in step S72.

In some embodiments, in step S74, the video capture device may transmit the status information to the network, if the video capture device determines that a number of terminals currently connected with it exceeds a preset threshold. The video capture device may also generate data packets based on the status information, and transmit the data packets, periodically between a certain time interval.

In some embodiments, if the system determines that the at least one connection status parameter exceeds a preset threshold, the system may transmit the status information to the predetermined terminal.

As an illustrative example, a video capture device (e.g., a camera) may be communicatively coupled with a smart router over a network. The camera may receive a communication request from a terminal such as a mobile phone, a tablet computer and the like, for accessing videos captured by the camera. After receiving the communication request, the camera may extract a terminal identifier from the communication request, and determine a number of terminals currently connected with the camera, based on the terminal identifier. The camera may transmit status information, including information about a number of terminals currently connected with the camera, to the smart router at a preset time, if the camera determines that a number of terminals currently connected with the camera exceeds a preset threshold. The camera may also generate data packets (e.g., heartbeat packets) based on the status information and transmit the data packets to the smart router periodically at a fixed frequency.

Upon reception of the status information from the camera, the smart router may extract the information about a number of terminals currently connected with the camera from the status information, and transmit the status information to a predetermined terminal such as, for example, a mobile phone, a tablet computer, etc. The predetermined terminal can be operated by an administer of the camera.

There are various manners by which the predetermined terminal can receive the status information of the camera from the smart router. For example, the predetermined terminal may transmit a query for status information of the camera. The smart router, in response to the query, may acquire the status information of the camera. The smart router may transmit the acquired status information to the predetermined terminal. As another example, the smart router may transmit the status information at preset times (e.g., periodically between one time interval, or between different time intervals), if the smart router determines that a number of terminals connected with the video capture device exceeds a preset threshold.

With embodiments of the present disclosure, a terminal (e.g., a mobile phone, a tablet computer, etc., operated to access the video data captured by the video capture device) may connect directly with a video capture device by transmitting a communication request, which enables the terminal to access the video capture device in an easy and convenient manner. Moreover, a predetermined terminal (e.g., a mobile phone, a tablet computer, etc.), operated by an administrator of the camera, may also receive status information of the camera after transmitting a query, or when a number of terminals connected with the video capture device exceeds a preset threshold. Accordingly, the predetermined terminal may receive information about a number of terminals connected with the video capture device in real-time. With such an arrangement, the likelihood of unauthorized access of the video capture device can be minimized, and the operation of the video capture device can become more secure.

Figure 8:
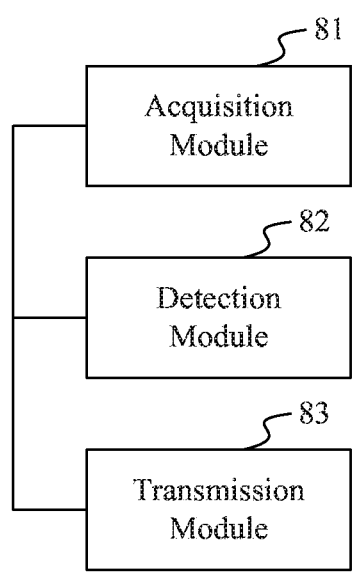
FIG. 8 is a block diagram illustrating an apparatus for providing an operation status of a video capture device over a network, according to an exemplary embodiment.

FIG. 8 is a block diagram illustrating an apparatus 800 for providing an operation status of a video capture device over a network, according to an exemplary embodiment. Apparatus 800 may be part of a video capture device connected with a network. As shown in FIG. 8, apparatus 800 includes an acquisition module 81, a detection module 82 and a transmission module 83.

Acquisition module 81 is configured to receive a communication request sent from a terminal.

Detection module 82 is configured to determine, based on the communication request, a number of terminals connected with the video capture device.

Transmission module 83 is configured to transmit status information of the video capture device to the network. The status information may include information of one or more terminals connected with the video capture device.

Figure 9:
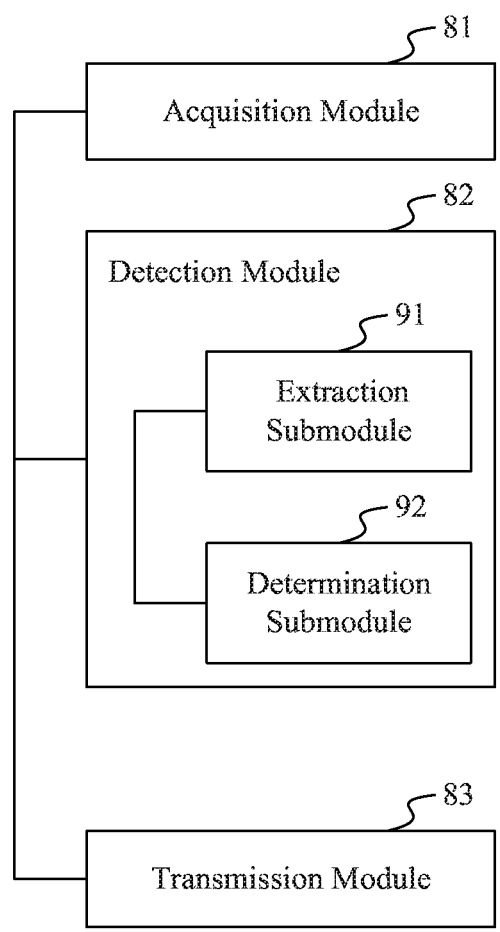
FIG. 9 is a block diagram illustrating an apparatus for providing an operation status of a video capture device over a network, according to an exemplary embodiment.

FIG. 9 is a block diagram illustrating exemplary submodules of detection module 82 of FIG. 8, according to an exemplary embodiment. As shown in FIG. 9, detection module 82 includes an extraction submodule 91, and a determination submodule 92.

Extraction submodule 91 is configured to extract a terminal identifier from the communication request.

Determination submodule 92 is configured to determine the at least one connection status parameter of the video capture device. The connection status parameter can include at least one of: a first value representing a number of terminals currently connected with the video capture device, and a second value representing a number of terminals connected with the video capture device during a preset time interval.

Figure 10:
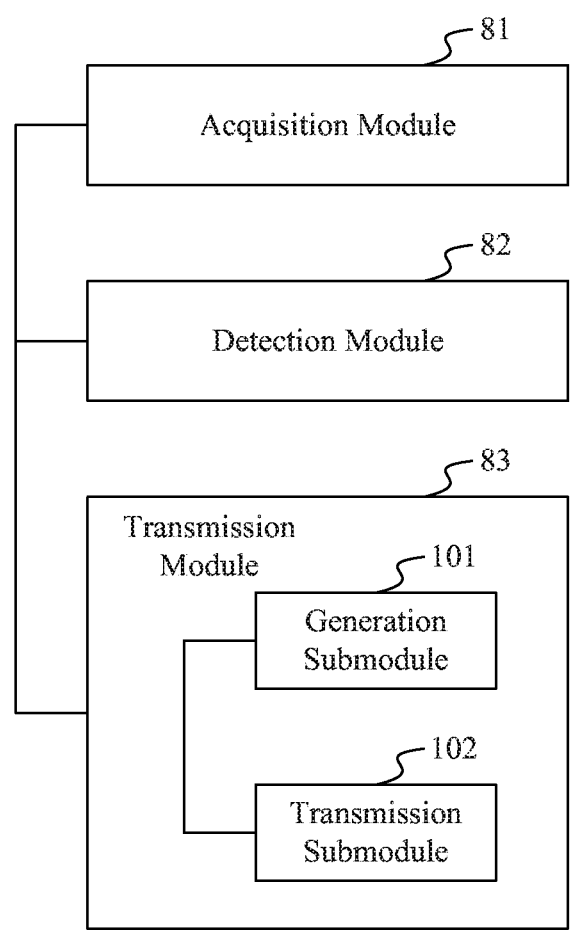
FIG. 10 is a block diagram illustrating exemplary sub-modules of the apparatus of FIG. 9, according to an exemplary embodiment.

FIG. 10 is a block diagram illustrating exemplary submodules of transmission module 83 of FIG. 8, according to an exemplary embodiment. As shown in FIG. 10, transmission module 83 includes a generation submodule 101 and a transmission submodule 102.

Generation submodule 101 is configured to generate data packets (e.g., heartbeat packets) based on the status information of the video capture device. The data packets can be generated periodically between a certain time interval.

Transmission submodule 102 is configured to transmit the data packet to the network periodically at the certain time interval.

Figure 11:
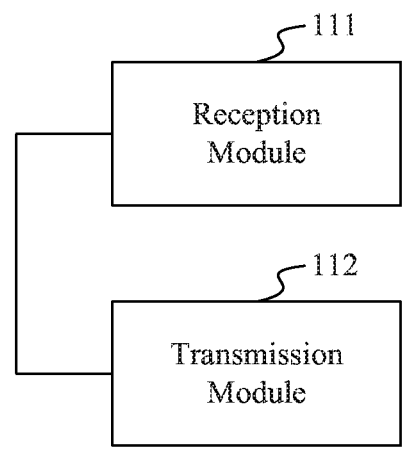
FIG. 11 is a block diagram illustrating exemplary sub-modules of the apparatus of FIG. 9, according to an exemplary embodiment.

FIG. 11 is a block diagram illustrating an apparatus 1100 for providing an operation status of a video capture device over a network, according to an exemplary embodiment. Apparatus 1100 may be a system (e.g., a server, a router, etc.) that is communicatively coupled with a video capture device via a network. As shown in FIG. 11, apparatus 1100 includes a reception module 111 and a transmission module 112.

Reception module 111 is configured to receive, from the video capture device, status information including information of terminals connected with the video capture device.

Transmission module 112 is configured to transmit the status information to a predetermined terminal, wherein the predetermined terminal is a terminal associated with the video capture device.

Figure 12:
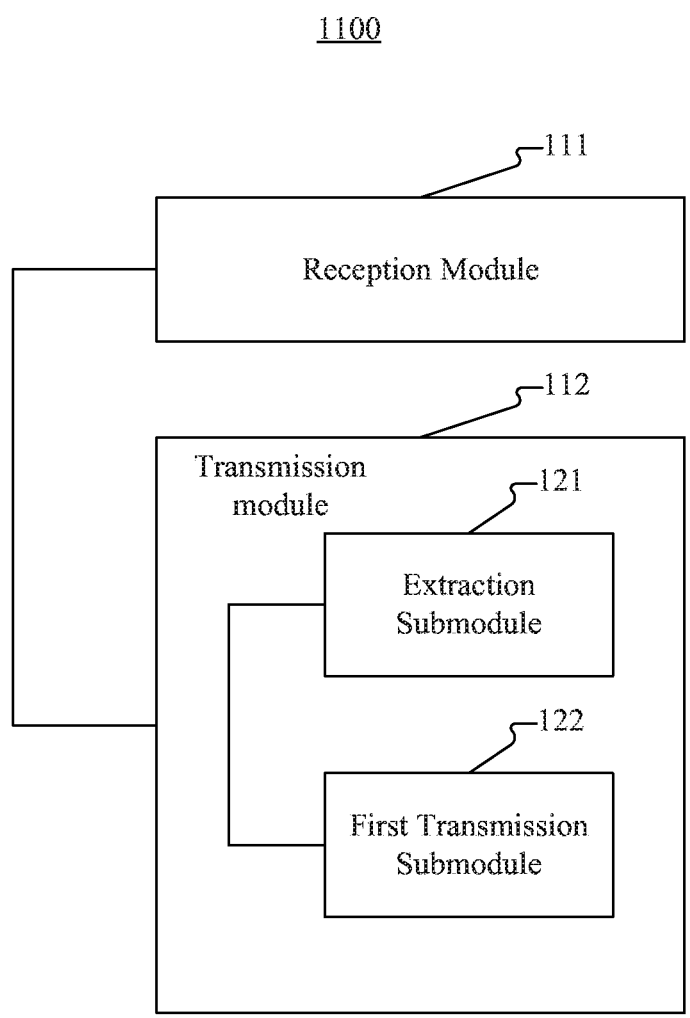
FIG. 12 is a block diagram illustrating exemplary sub-modules of the apparatus of FIG. 11, according to an exemplary embodiment.

FIG. 12 is a block diagram illustrating exemplary submodules of transmission module 112 of FIG. 11, according to an exemplary embodiment. As shown in FIG. 12, transmission module 112 includes an extraction submodule 121 and a first transmission submodule 122.

Extraction submodule 121 is configured to extract at least one connection status parameter of the video capture device from the status information.

First transmission submodule 122 is configured to: determine whether the at least one connection status parameter exceeds a preset threshold, and if the at least one connection status parameter is determined to exceed the preset threshold, transmit the status information to the predetermined terminal.

Figure 13:
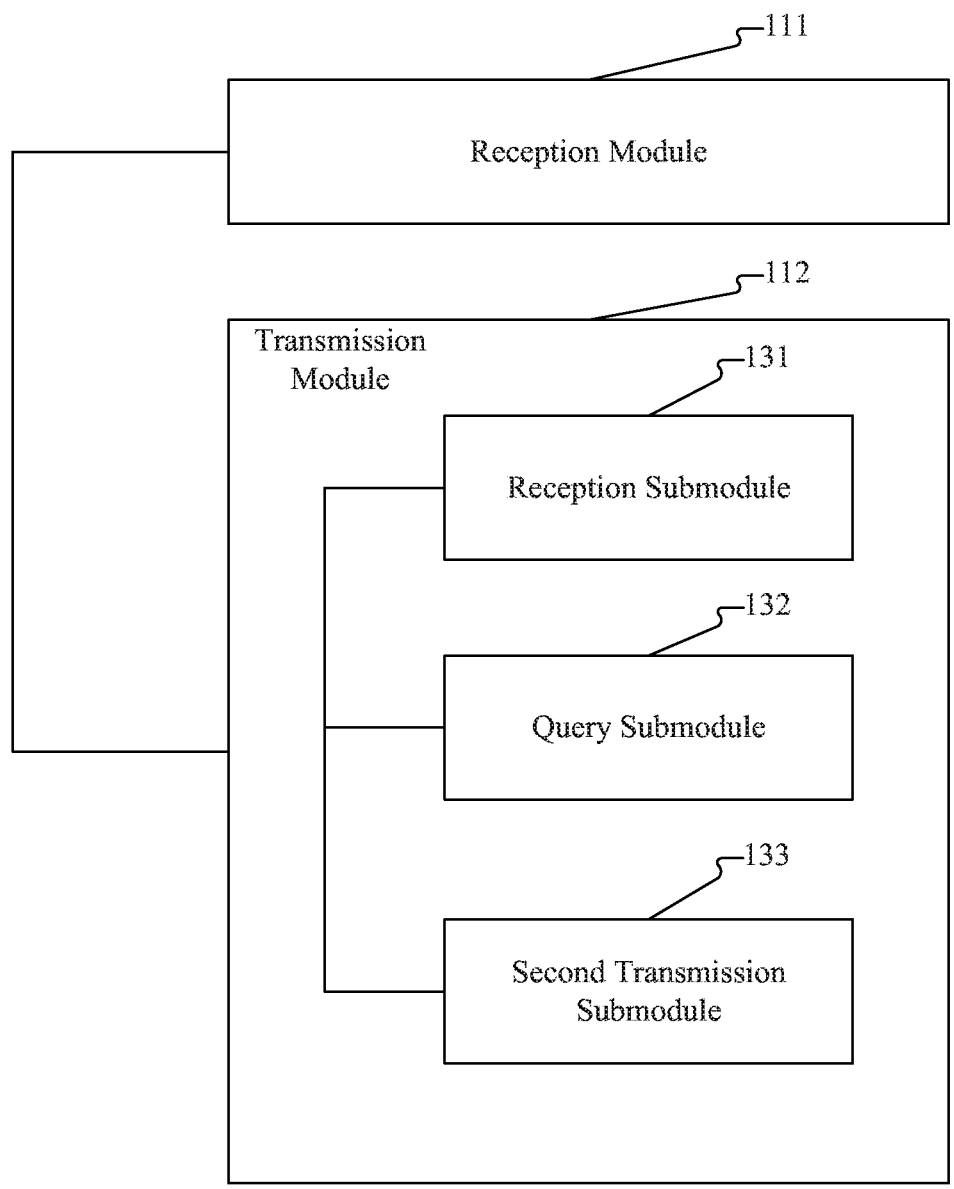
FIG. 13 is a block diagram illustrating exemplary sub-modules of the apparatus of FIG. 11, according to an exemplary embodiment.

FIG. 13 is a block diagram illustrating exemplary submodules of transmission module 112 of FIG. 11, according to an exemplary embodiment. As shown in FIG. 13, transmission module 112 includes a reception submodule 131, a query submodule 132, and a second transmission submodule 133.

Reception submodule 131 is configured to receive a query from the predetermined terminal.

Query submodule 132 is configured to, in response to the query, acquire status information of a video capture device associated with the predetermined terminal.

Second transmission submodule 133 is configured to transmit the status information to the predetermined terminal.

Figure 14:
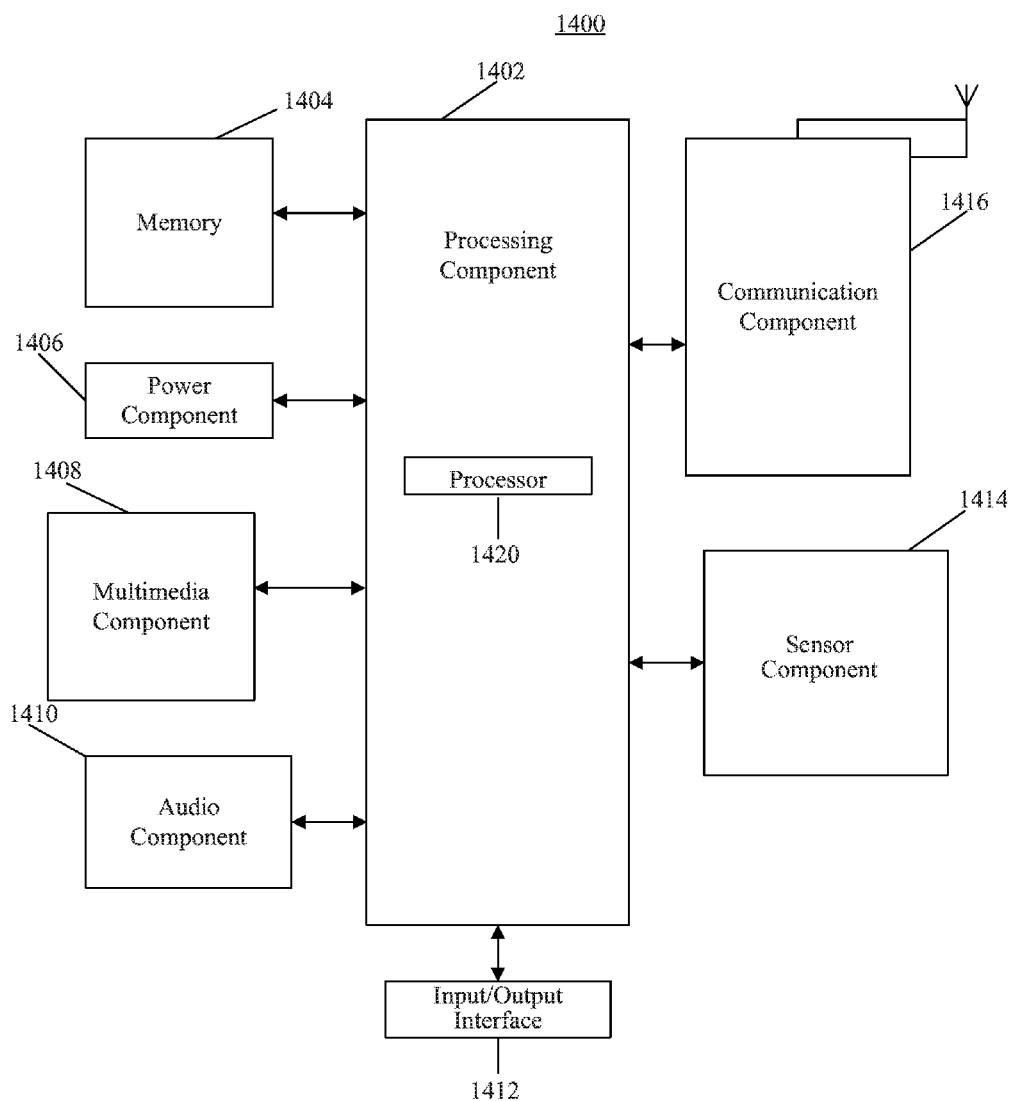
FIG. 14 is a block diagram illustrating an apparatus on which embodiments of the present disclosure can be implemented.

FIG. 14 is a block diagram illustrating an apparatus 1400 on which embodiments of the present disclosure can be implemented. The apparatus 1400 may be applicable in a terminal device associated with the video capture device according to the present disclosure. The apparatus 1400 may be anyone selected from a group including a mobile phone, a computer, a digital broadcast terminal device, a messaging device, a gaming console, a tablet, a medical device, an exercise equipment, a personal digital assistant (PDA), and the like.

The apparatus 1400 may include one or more of the following components: a processing component 1402, a memory 1404, a power component 1406, a multimedia component 1408, an audio component 1410, an input/output (I/O) interface 1412, a sensor component 1414, and a communication component 1416.

The processing component 1402 generally controls overall operations of the apparatus 1400, such as operations associated with display, telephone calls, data communications, camera operations, and recording operations. The processing component 1402 may include one or more processors 1420 to execute instructions to perform all or part of the steps in the above described methods. Moreover, the processing component 1402 may include one or more modules which facilitate interaction between the processing component 1402 and other components. For instance, the processing component 1402 may include a multimedia module to facilitate the interaction between the multimedia component 1408 and the processing component 1402.

The memory 1404 is configured to store various types of data to support the operation of the apparatus 1400. Examples of such data include instructions for any application or method operated on the apparatus 1400, contact data, phonebook data, messages, pictures, videos, etc. The memory 1404 may be implemented using any type of volatile or non-volatile memory apparatus or combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 1406 provides power to various components of the apparatus 1400. The power component 1406 may include a power management system, one or more power sources, and other components associated with the generation, management, and distribution of power in the apparatus 1400.

The multimedia component 1408 includes a screen providing an output interface between the apparatus 1400 and the user. In some embodiments, the screen may include a liquid crystal display (LCD) and a touch panel (TP). If the screen includes the touch panel, the screen may be implemented as a touch screen to receive input signal from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 1408 includes a front camera and/or a rear camera. The front camera and/or the rear camera may receive an external multimedia datum while the apparatus 1400 is in an operation mode, such as a photographing mode or a video mode. Each of the front camera and the rear camera may be a fixed optical lens system or have focus and optical zoom capability.

The audio component 1410 is configured to output and/or input audio signal. For example, the audio component 1410 includes a microphone (MIC) configured to receive external audio signal when the apparatus 1400 is in an operation mode, such as a call mode, a recording mode, and a voice identification mode. The received audio signal may be further stored in the memory 1404 or transmitted via the communication component 1416. In some embodiments, the audio component 1410 further includes a speaker to output audio signal.

The I/O interface 1412 provides an interface between the processing component 1402 and peripheral interface modules, such as a keyboard, a click wheel, a button, or the like. The button may include, but not limited to, a home button, a volume button, a starting button, or a locking button.

The sensor component 1414 includes one or more sensors to provide status assessments of various aspects of the apparatus 1400. For instance, the sensor component 1414 may detect an open/closed status of the apparatus 1400, relative positioning of components, e.g., the display and the keyboard, of the apparatus 1400, a change in position of the apparatus 1400 or a component of the apparatus 1400, a presence or absence of user contact with the apparatus 1400, an orientation or an acceleration/deceleration of the apparatus 1400, and a change in temperature of the apparatus 1400. The sensor component 1414 may include a proximity sensor configured to detect the presence of nearby objects without any physical contact. The sensor component 1414 may also include a light sensor, such as a CMOS or CCD image sensor, for use in imaging applications. In some embodiments, the sensor component 1414 may also include an accelerometer sensor, a gyroscope sensor, a magnetic sensor, a pressure sensor, or a temperature sensor.

The communication component 1416 is configured to facilitate communication, wired or wirelessly, between the apparatus 1400 and other apparatuses. The apparatus 1400 may access a wireless network based on a communication standard, such as WIFI, 2G, or 3G, or a combination thereof. In one exemplary embodiment, the communication component 1416 receives broadcast signal or broadcast associated information from an external broadcast management system via a broadcast channel. In one exemplary embodiment, the communication component 1416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1400 may be implemented with one or more application specific integrated circuits (ASICs), digital signal processors (DSPs), digital signal processing apparatuses (DSPDs), programmable logic apparatuses (PLDs), field programmable gate arrays (FPGAs), controllers, micro-controllers, microprocessors, or other electronic components, for performing the above method.

In exemplary embodiments, there is also provided a non-transitory computer readable storage medium including instructions, such as instructions included in the memory 1404, executable by the processor 1420 in the apparatus 1400, for performing the above method. For example, the non-transitory computer-readable storage medium may be a ROM, a random access memory (RAM), a CD-ROM, a magnetic tape, a floppy disc, an optical data storage apparatus, or the like. The non-transitory computer readable medium may store instructions that correspond to any of the modules and submodules of FIGS. 8-13. The instructions, when executed by processor 1420, may also cause processor 1420 to perform any of methods of FIGS. 1-7.

Figure 15:
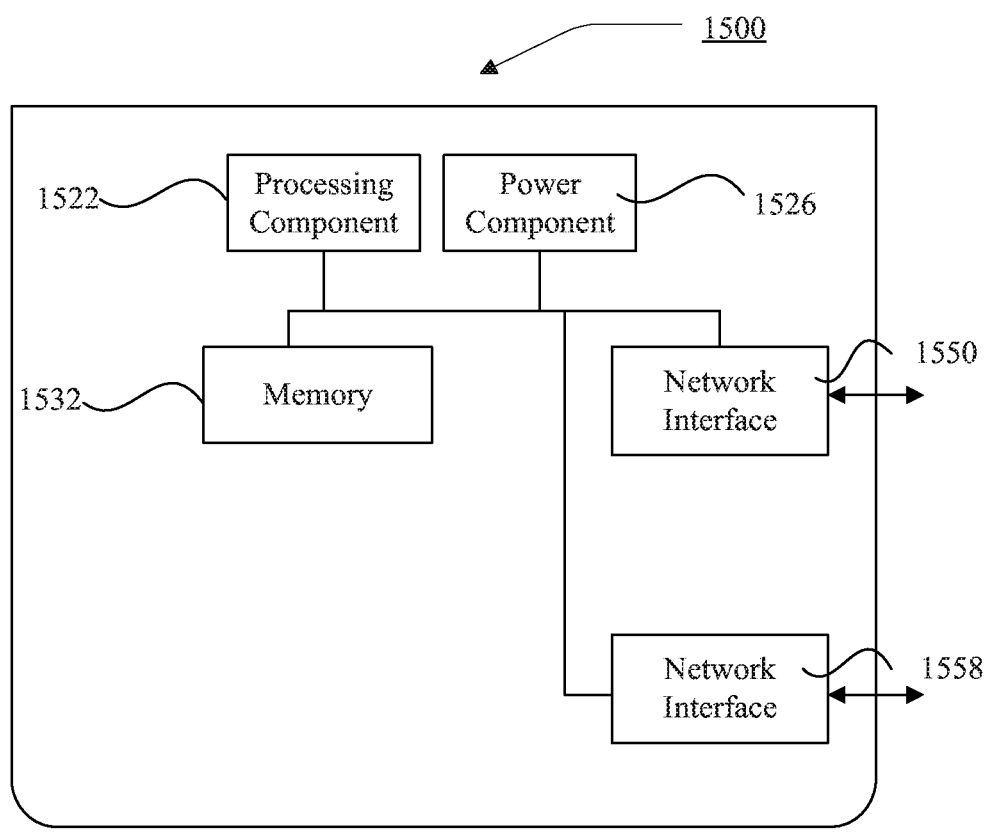
FIG. 15 is a block diagram illustrating an apparatus on which embodiments of the present disclosure can be implemented.

FIG. 15 is a block diagram illustrating an apparatus on which embodiments of the present disclosure can be implemented. For example, the apparatus 1500 may be connected with a network. The apparatus 1500 includes: a processing component 1522 which may further include one or more processors, and memory resource represented by a memory 1532 which is configured to store instructions, such as application programs, executable by the processing component 1522. The application programs may include one or more modules each corresponding to a set of instructions. Furthermore, the processing component 1522 is configured to execute the instructions so as to perform the method described above.

The apparatus 1500 may also include a power component 1526 configured to perform power management of the apparatus 1500, a wired or wireless network interface 1550 configured to connect the apparatus 1500 with a network, and an Input/Output (I/O) interface 1558. Then apparatus 1500 may be operated based on an operating system stored on the memory 1532, such as Windows Server™, Mac OS X™, Unix™, Linux™, FreeBSD™ or the like.

Other embodiments of the invention will be apparent to those skilled in the art from consideration of the specification and practice of the invention disclosed herein. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for providing an operation status of a video capture device over a network, the method being performed by the video capture device and comprising:
   receiving, by the video capture device, a communication request from a predetermined terminal;
   determining, based on the communication request, one or more terminals connected with the video capture device, wherein the determining one or more terminals connected with the video capture device comprises:
      extracting a terminal identifier from the communication request; and
      determining, based on the extracted terminal identifier, at least one connection status parameter of the video capture device, the at least one connection status parameter including at least one of: a first value representing a number of terminals currently connected with the video capture device, and a second value representing a number of terminals connected with the video capture device during a preset time interval;
   transmitting status information of the video capture device over the network and to the predetermined terminal, the status information including information of the one or more terminals connected with the video capture device,
      wherein the information of the one or more terminals connected with the video capture device comprises the connection status parameter of the video capture device, and
      wherein the status information of the video capture device is transmitted to the network after the video capture device determines that the at least one connection status parameter exceeds a preset threshold.

2. The method according to claim 1, wherein transmitting status information of the video capture device to the network comprises:
   generating a heartbeat packet based on the status information; and
   transmitting the heartbeat packet to the network.

3. A method for providing an operation status of a video capture device over a network, the method being performed by a system communicatively coupled with the video capture device over the network and comprising:
   receiving by the system, from the video capture device, status information including information of one or more terminals connected with the video capture device; and transmitting the status information to a predetermined terminal, wherein the predetermined terminal is a terminal associated with the video capture device, and the transmitting comprises:
  extracting a terminal identifier from a communication request sent by the predetermined terminal;
  extracting, based on the terminal identifier, at least one connection status parameter of the video capture device from the status information, wherein the at least one connection status parameter includes at least one of: a first value representing a number of terminals currently connected with the video capture device, and a second value representing a number of terminals connected with the video capture device during a preset interval;
  determining whether the at least one connection status parameter exceeds a preset threshold; and
  after determining that the at least one connection status parameter exceeds the preset threshold, transmitting the status information to the predetermined terminal.

4. The method according to claim 3, wherein transmitting the status information to a predetermined terminal comprises:
  receiving a query request sent from the predetermined terminal;
  after receiving the query request, acquiring the status information; and
  transmitting the acquired status information to the predetermined terminal.

5. The method according to claim 3, wherein transmitting the status information to a predetermined terminal comprises:
  transmitting the status information to the predetermined terminal periodically.

6. An apparatus for providing an operation status of a video capture device over a network, comprising:
  a processor; and
  a memory for storing instructions executable by the processor, wherein the processor is configured to:
    receive a communication request from a predetermined terminal;
    determine, based on the communication request, one or more terminals connected with the video capture device;
    transmit status information of the video capture device to the network, the status information including information of the one or more terminals connected with the video capture device;
  wherein, in determining one or more terminals connected with the video capture device, the processor is further configured to:
    extract a terminal identifier from the communication request;
    determine, based on the extracted terminal identifier, at least one connection status parameter of the video capture device, the at least one connection status parameter including at least one of: a first value representing a number of terminals currently connected with the video capture device, and a second value representing a number of terminals connected with the video capture device during a preset time interval,
  wherein the information of the one or more terminals connected with the video capture device comprises the at least one connection status parameter of the video capture device, and
  wherein the status information of the video capture device is transmitted to the network after the apparatus determines that the at least one connection status parameter exceeds a preset threshold.

7. The apparatus according to claim 6, wherein the information of the one or more terminals connected with the video capture device further comprises one or more terminal identifiers of the one or more terminals.

8. The apparatus according to claim 6, wherein the processor is further configured to: generate a heartbeat packet based on the status information; and transmit the heartbeat packet to the network.

9. An apparatus for providing an operation status of a video capture device over a network, comprising:
  a processor; and
  a memory for storing instructions executable by the processor, wherein the processor is configured to:
    receive, from the video capture device, status information including information of one or more terminals connected with the video capture device; and
    transmit the status information to a predetermined terminal, wherein the predetermined terminal is a terminal associated with the video capture device, wherein, in transmitting the status information, the processor is further configured to:
      extract a terminal identifier from a communication request sent by the predetermined terminal;
      extract, based on the terminal identifier, at least one connection status parameter of the video capture device from the status information, wherein the at least one connection status parameter includes at least one of: a first value representing a number of terminals currently connected with the video capture device, and a second value representing a number of terminals connected with the video capture device during a preset interval;
      determine whether the at least one connection status parameter exceeds a preset threshold; and
      after determining that the at least one connection status parameter exceeds the preset threshold, transmit the status information to the predetermined terminal.

10. The apparatus according to claim 9, wherein the processor is further configured to:
  receive a query request from the predetermined terminal;
  after receiving the query request, acquire the status information; and
  transmit the acquired status information to the predetermined terminal.

11. The apparatus according to claim 9, wherein the processor is further configured to: transmit the status information to the predetermined terminal periodically.

* * * * *